US007752664B1

(12) United States Patent
Satish et al.

(10) Patent No.: US 7,752,664 B1
(45) Date of Patent: Jul. 6, 2010

(54) USING DOMAIN NAME SERVICE RESOLUTION QUERIES TO COMBAT SPYWARE

(75) Inventors: Sourabh Satish, Fremont, CA (US); Brian Hernacki, San Carlos, CA (US)

(73) Assignee: Symantec Corporation, Cupertino, CA (US)

( * ) Notice: Subject to any disclaimer, the term of this patent is extended or adjusted under 35 U.S.C. 154(b) by 1230 days.

(21) Appl. No.: 11/313,183

(22) Filed: Dec. 19, 2005

(51) Int. Cl.
*G06F 21/00* (2006.01)

(52) U.S. Cl. ............................. 726/22; 726/23; 726/24; 726/25; 713/187; 713/188

(58) Field of Classification Search ............. 726/22–25; 713/187–188
See application file for complete search history.

(56) References Cited

U.S. PATENT DOCUMENTS

| | | | |
|---|---|---|---|
| 6,088,803 | A | 7/2000 | Tso et al. |
| 6,314,409 | B2 | 11/2001 | Schneck |
| 6,928,553 | B2 | 8/2005 | Xiong et al. |
| 7,487,546 | B1 * | 2/2009 | Szor ............................ 726/25 |
| 2002/0083343 | A1 | 6/2002 | Crosbie |
| 2002/0087882 | A1 | 7/2002 | Schneier et al. |
| 2002/0157020 | A1 | 10/2002 | Royer |
| 2003/0037251 | A1 | 2/2003 | Frieder |
| 2003/0051026 | A1 | 3/2003 | Carter |
| 2004/0187023 | A1 * | 9/2004 | Alagna et al. ................ 713/200 |
| 2006/0123478 | A1 * | 6/2006 | Rehfuss et al. ................. 726/22 |
| 2006/0282890 | A1 * | 12/2006 | Gruper et al. .................. 726/22 |

FOREIGN PATENT DOCUMENTS

WO        WO 01/71499 A1    9/2001

OTHER PUBLICATIONS

Lee, Sin Yeung; Low, Wai Lup and Wong, Pei Yuen, "Learning Fingerprints for a Database Intrusion Detection System", Computer Security Laboratory, DSO National Labortories, Singapore, ESORICS Nov. 2002, LNCS 2502, pp. 264-279.
Low, Wai Lup, et al., "DIDAFIT: Detecting Intrusions In Databases Through Fingerprinting Transactions," ICEIS 2002, Fourth International Conference on Enterprise Information Systems, vol. 1, Apr. 3-6, 2002, pp. 121-128, Ciudad Real, Spain.

(Continued)

*Primary Examiner*—Nasser Moazzami
*Assistant Examiner*—Ghazal Shehni
(74) *Attorney, Agent, or Firm*—Fenwick & West LLP

(57) ABSTRACT

An anti-spyware manager uses domain name service resolution queries to combat spyware. The anti-spyware manager maintains a list of domain names associated with spyware, monitors domain name service queries, and detects queries on domain names on the list. Responsive to detecting a domain name service query on a domain name associated with spyware, the anti-spyware manager forces the domain name service query to resolve to an address not associated with the domain name. Because attempts by spyware to communicate with its home server are now routed to the forced address, the spyware is unable to communicate with its homer server, and thus can neither steal information nor download updates of itself. Additionally, the anti-spyware manager can identify computers that are infected with spyware and clean or quarantine them.

23 Claims, 3 Drawing Sheets

OTHER PUBLICATIONS

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~randyliw/snort/CHANGELOG>, U.S.A.

AirCERT web page, last updated Sep. 18, 2000 [online]. Cert.org [retrieved Apr. 18, 2003]. Retrieved from the Internet: <URL: http://www.cert.org/kb/aircert/>, U.S.A.

Analysis Console For Intrusion Detection (ACID) web page [online]. Andrew.cmu.edu [retrieved Apr. 18, 2003]. Retrieved from the Internet: <URL: http://www.andrew.cmu.edu/~randyliw/snort/snortacid.html>, U.S.A.

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>, U.S.A.

Web page, announcing Nov. 11, 2000 release of Dshield [online]. Deja.com [retrieved Apr. 18, 2003]. Retrieved from the Internet: >URL: http://groups.google.com/groups?selm=8vm48v%245pd%241%40nnrp1.deja.com&oe=UTF-8&output=gplain>, U.S.A.

e=SECURITY, Inc., Correlation Technology for Security Event Management, Oct. 7, 2002 [online]. eSecurityins.com [retrieved Apr. 18, 2003]. Retrieved from the Internet: <URL: http://www.esecurityinc.com/downloads/Correlation_WP.pdf>, Vienna, VA.

MyNetWatchman.com web pages indicating Sep. 2000 beta release [online]. MyNetWatchman.com [retrieved Apr. 18, 2003]. Retrieved from the Internet: <URL: http://www.mynetwatchman.com/mynetwatchman/relnotes.htm>, Alpharetta, GA.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>, U.S.A.

Slashdot.org web pages describing Dshield, dated Nov. 27, 2000 [online]. Slashdot.org [retrieved Apr. 18, 2003]. Retrieved from the Internet: <URL: http://slashdot.org/article/pl?sid=00/11/27/1957238&mode=thread>, U.S.A.

Chung, C., Gertz, M., and Levitt, K., "DEMIDS: A Misuse Detection System for Database Systems," Department of Computer Science, University of California at Davis, Oct. 1, 1999, pp. 1-18.

SCIP Product, Microdasys—"The need to control, inspect and manage encrypted webtraffic."[online]. Retrieved on Mar. 18, 2005. Retrieved from the Internet: <URL: http://www.microdasys.com/scipproduct+M54a708de802.html>. Author unknown, 2 pages, Czech Republic.

Microdasys, "S C I P Secured Content Inspection: Protecting the Enterprise from CryptoHacks," 2003 by Microdasys Inc., 2 pages, Czech Republic.

Marketing, "Digital Certificates—Best Practices—A Microdasys Whitepaper," bestpractice.doc, Revision 1.1 (Jul. 31, 2003), 6 pages, Czech Republic.

Network Computing Solutions—"Microdasys SCIP" [online]. Retrieved on Mar. 18, 2005. Retrieved from the Internet: <URL: http://www.ncs/cz/index.php?language=en&menuitem-4&subitem=13>, 2 pages, Czech Republic.

Network Computing Solutions—NSC Homepage—News [online]. Retrieved on Mar. 18, 2005. Retrieved from the Internet: <URL: http://www.nsc.cz/index.php?language=en&menuitem=0&subitem=4&subitem=13>, 3 pages, Czech Republic.

"SSL Stripper Installation Guide," [online]. Retrieved in Mar. 2005 from the Internet: <URL: http://www.sslstripper.com>, 2 pages, U.S.A.

SSL Stripper Home Page, "Security Solutions: SSL Stripper," [online]. Retrieved on Mar. 18, 2005. Retrieved from the Internet: <URL: http://www.vroyer.org/sslstripper/index.html?, 2 pages, Oct. 15, 2004, U.S.A.

SSL Stripper Sample Screenshots, "Security Solutions: Sample Screenshots," [online]. Retrieved on Mar. 18, 2005. Retrieved from the Internet: <URL: http://www.vroyer.org/sslstripper/screenshots.html>, 3 pages, Oct. 15, 2004, U.S.A.

Webwasher AG/Full feature set, "Full feature set," [online]. Retrieved on Mar. 18, 2005. Retrieved from the Internet: <URL: http://www.webwasher.com/enterprise/products/webwasher_products/ssl_scanner/full_feature_set..html?I...>, 2 pages.

Webwasher AG/Webwasher 1000 CSM Appliance, "Webwasher 1000 CSM Appliance," [online]. Retrieved on Mar. 18, 2005. Retrieved from the Internet: <URL: http://www.webwasher.com/enterprise/products/webwasher_products/csm_appliance/index...> 2 pages.

Webwasher AG/Webwasher URL Filter, "Webwasher URL Filter," [online]. Retrieved on Mar. 18, 2005. Retrieved from the Internet: <URL: http://www.webwasher.com/enterprise/products/webwasher_products/webwasher_url_filter..> 1 page.

Webwasher AG/Webwasher Anti Virus, "Webwasher Anti Virus," [online]. Retrieved on Mar. 18, 2005. Retrieved from the Internet: <URL:.

Webwasher AG/Webwasher Anti Spam, "Webwasher Anti Spam," [online]. Retrieved on Mar. 18, 2005. Retrieved from the Internet: <URL: http://www.webwasher.com/enterprise/products/webwasher_products/anti_spam/index.htm...>, 1 page.

Webwasher AG/Webwasher Content Protection, "Webwasher Content Protection," [online]. Retrieved on Mar. 18, 2005. Retrieved from the Internet: <URL: http://www.webwasher.com/enterprise/products/webwasher_products/content_protection/index.html>, 2 pages.

Webwasher AG/Webwasher SSL Scanner, "Webwasher SSL Scanner," [online]. Retrieved on Mar. 18, 2005. Retrieved from the Internet: <URL: http://www.webwasher.com/enterprise/products/webwasher_products/ssl_scanner/index.html>, 2 pages.

CyberGuard Corporation, "CyberGuard and Webwasher: The Value Proposition," A CyberGuard Corporation White Paper, May 2004, 6 pages.

* cited by examiner

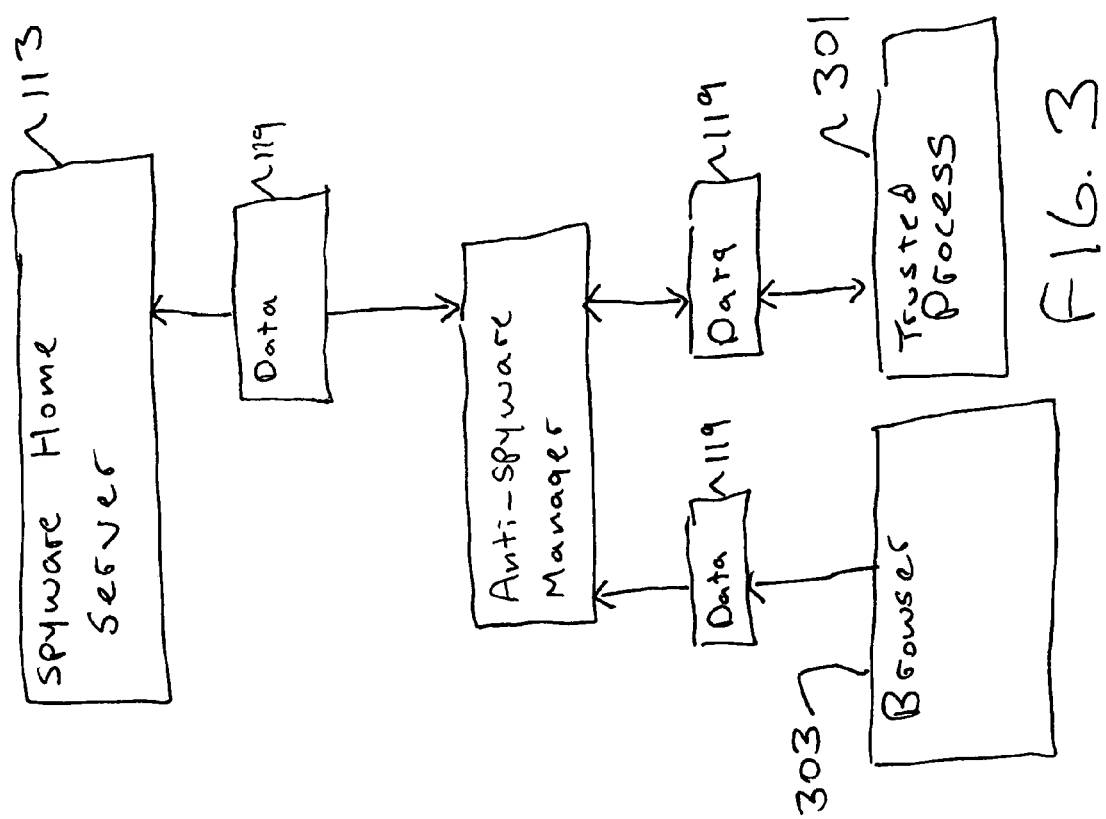

USING DOMAIN NAME SERVICE RESOLUTION QUERIES TO COMBAT SPYWARE

TECHNICAL FIELD

This invention pertains generally to computer security, and more specifically to using domain name service resolution queries to combat spyware.

BACKGROUND

Spyware (sometimes also known as adware or thiefware) is one of the fastest growing computer security problems today. Enterprises, Internet service providers and home users are all vulnerable to spyware, which installs itself on computers, executes thereon, gathers information about the computer and its user(s) and transmits this ill-gotten information back to a central repository (e.g., a spyware home server).

Commercial software exists today which detects known spyware on computers by scanning for identifying signatures. Such software then eliminates detected spyware. However, spyware is often quite sophisticated, and contacts home servers not only to send its stolen information, but also to update itself by downloading newer versions. Not only can the newer versions be more effective at gleaning information, but they can also be engineered to spoof scanning software. Some spyware is so well engineered that it continues to download newer versions from its home server with altered binary layouts, and thus remains undetected by signature based detection systems.

What is needed are methods, systems and computer readable media for preventing spyware from communicating to its home servers, thereby preventing both the theft of information and the updating of the spyware itself. It would also be desirable for the methods, systems and computer readable media to be able to identify computers that are infected with spyware.

SUMMARY OF INVENTION

Computer-implemented methods, computer systems and computer-readable media use domain name service resolution queries to combat spyware. An anti-spyware manager maintains a list of domain names associated with spyware. The anti-spyware manager monitors domain name service queries, and detects queries on domain names on the list. Responsive to detecting a domain name service query on a domain name associated with spyware, the anti-spyware manager forces the domain name service query to resolve to an address not associated with the domain name. Where the monitoring is executed at an enterprise level, the forced address can be that of a honeypot server within the enterprise. Where the monitoring is executed at a local host level, the query is resolved to the IP address of the local host. Because attempts by spyware to communicate with its home server are now routed to the forced address, the spyware is unable to communicate with its homer server, and thus can neither steal information nor download updates of itself. Additionally, the anti-spyware manager can identify computers that are infected with spyware and clean or quarantine them as desired.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWING

FIG. 3 is a block diagram illustrating an anti-spyware manager providing selective blocking of spyware home servers, according to other embodiments of the present invention.

The Figures depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
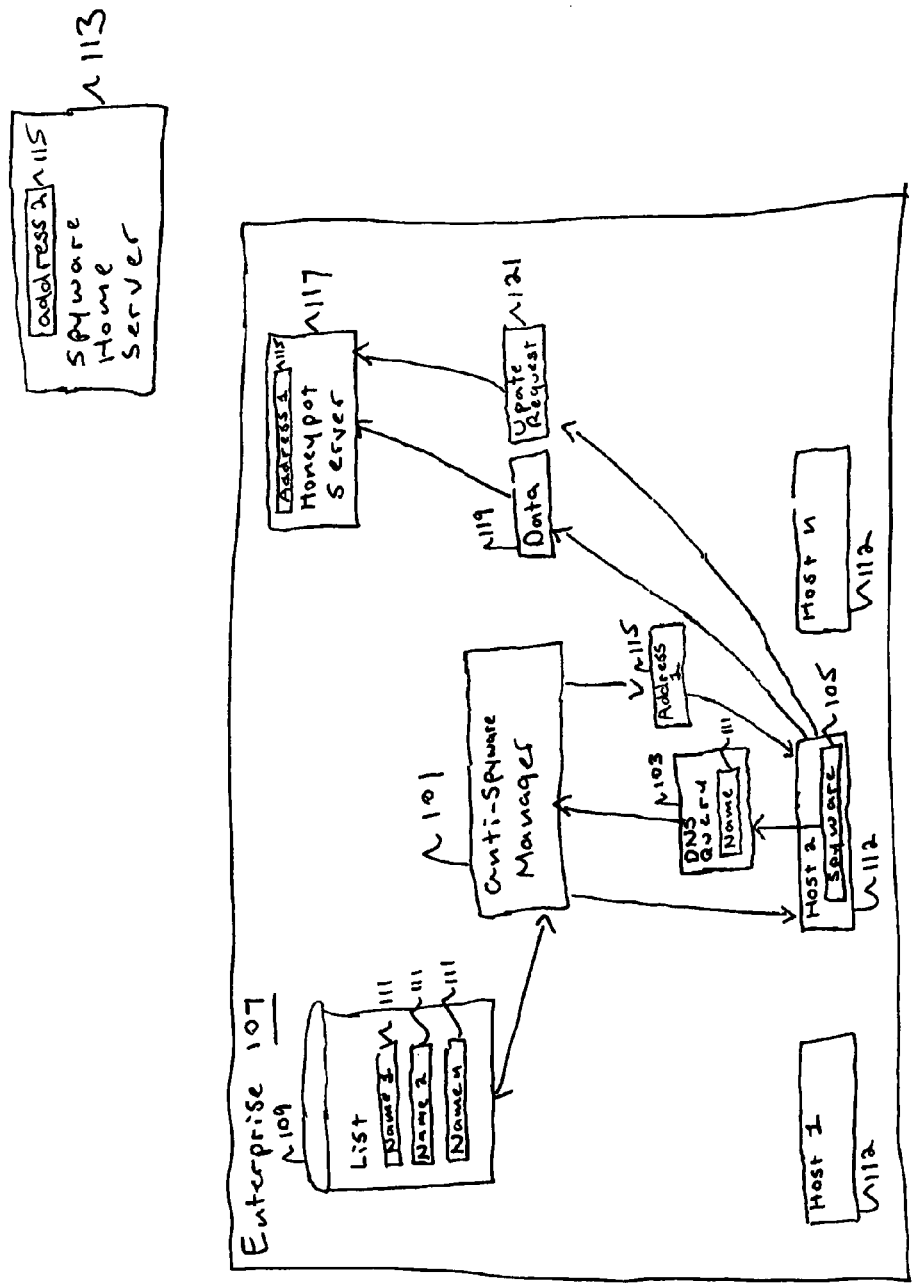
FIG. 1 is a block diagram illustrating a high level overview of an anti-spyware manager using domain name service resolution queries to combat spyware at an enterprise level, according to some embodiments of the present invention.

FIG. 1 illustrates an anti-spyware manager 101 using domain name service (DNS) resolution queries 103 to combat spyware 105 at an enterprise 107 level, according to some embodiments of the present invention. It is to be understood that although the anti-spyware manager 101 is illustrated as a single entity, as the term is used herein an anti-spyware manager 101 refers to a collection of functionalities which can be implemented as software, hardware, firmware or any combination of these. Where an anti-spyware manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries. Note that in FIG. 1 the anti-spyware manager 101 is illustrated as residing within the enterprise 107, but in other embodiments the anti-spyware manager 101 can be located externally from the enterprise 107 as desired.

As illustrated in FIG. 1, the anti-spyware manager 101 manager maintains a list 109 of domain names 111 associated with spyware 105. Because spyware home servers 113 tend to have multiple and changing locations, spyware 105 generally knows its home servers 113 by domain name 111 as opposed to Internet Protocol (IP) address 115. Thus, in order to contact a home server 113, spyware 105 generally performs a DNS resolution query 103 in order to obtain a working IP address 115 for a home server 113.

The list 109 of domain names 111 associated with spyware 105 can be supplied in whole or in part from a centralized source of computer security data (not pictured), and/or provided by or edited at an enterprise 107 or local level. In any case, domain names 111 used by known spyware 105 can be learned by watching the operation of known the spyware 105. The domain names 111 gleaned from such observation can then be used within the context of the present invention. For example, when installed on a host computer 112 the known spyware program Adware.Hotbar contacts servers identified by the following domain names 111:

https://www.verisign.com/rpa http://partners.hotbar.com
http://hotbar.com
https://secure.hotbar.com/secure/HBsubscribe/Store.asp
http://crl.verisign.com/pca3.crl0
http://crl.verisign.com/Class3CodeSigning2001.crl0
http://hotbar.com/license.htm Some of the domain names 111 such as those identifying verisign sites are well known. However others are clearly those of the home servers 113 of the Hotbar Adware program.

The anti-spyware manager 101 monitors DNS resolution queries 103, and detects queries 103 on domain names 111 on the list 109. When it detects such a query 103, the anti-spyware manager 101 forces the resolution to an IP address 115 of a computer under its control (e.g., a so called honey-pot server 117 within the enterprise 107, as illustrated) as opposed to the spyware home server 113 that the spyware 105 is attempting to contact. Thus, future attempts by the spyware 105 to communicate to the home server 113 will be directed to the honeypot server 117. The implementation mechanics of monitoring DNS resolution queries 103 are known to those of ordinary skill in the relevant art, and the manner in which to apply same within the context of the present invention will be readily apparent to those of such a skill level, in light of this specification. For example, in the illustrated embodiment in which spyware 105 is combated at an enterprise 107 level, the monitoring of DNS queries 103 can be implemented at a DNS Server level.

Because the anti-spyware manager 101 forces the DNS resolution queries 103 on spyware home servers 113 to resolve to the IP address 115 of the honeypot server 117, attempts by the spyware 105 to send stolen information 119 are redirected to the honeypot server 117. Thus, the information 119 is never obtained by the spyware home server 113. Additionally, the spyware 105 is not able to download updates of itself, as it is unable to obtain the IP address 115 of a home server 113, and sends its update requests 121 to the honeypot server instead.

When the anti-spyware manager 101 detects an attempt by a host computer 112 within the enterprise 107 to communicate with the IP address 115 to which the resolution of the domain name service query 103 was forced, the anti-spyware manager 101 determines that the host computer 112 that attempted the communication is infected with spyware 105. The anti-spyware manager 101 can make this conclusion because a process on the host computer 112 is attempting to communicate with a spyware home server 113 (note that the attempt is thwarted by the anti-spyware manager 101).

In other embodiments, the anti-spyware manager 101 determines that a host computer 112 is infected with spyware 105 responsive to detecting a domain name service query 103 on a domain name 111 on the list 109 of domain names 111 associated with spyware 105 originating from that host computer 112. When this occurs, a process on the host computer 112 is attempting to glean an IP address 115 for a spyware home server 113, and thus the anti-spyware manager 101 can conclude that the host computer 112 is infected.

When the anti-spyware manager 101 determines that a host computer 112 within the enterprise 107 is infected with the spyware, the anti-spyware manager 101 can take various steps in response, such as quarantining the host 112 to a remediation network (not illustrated), or extensively scanning the host 112 for spyware 105. Even if the spyware 105 on the host 112 can not be located and removed because its signature is not known, the spyware 105 is prevented from stealing information and updating itself. The anti-spyware manager 101 can continue to download the latest signatures, so as to detect and remove the spyware 105 from the host 112 once a signature for that spyware is available.

Figure 2:
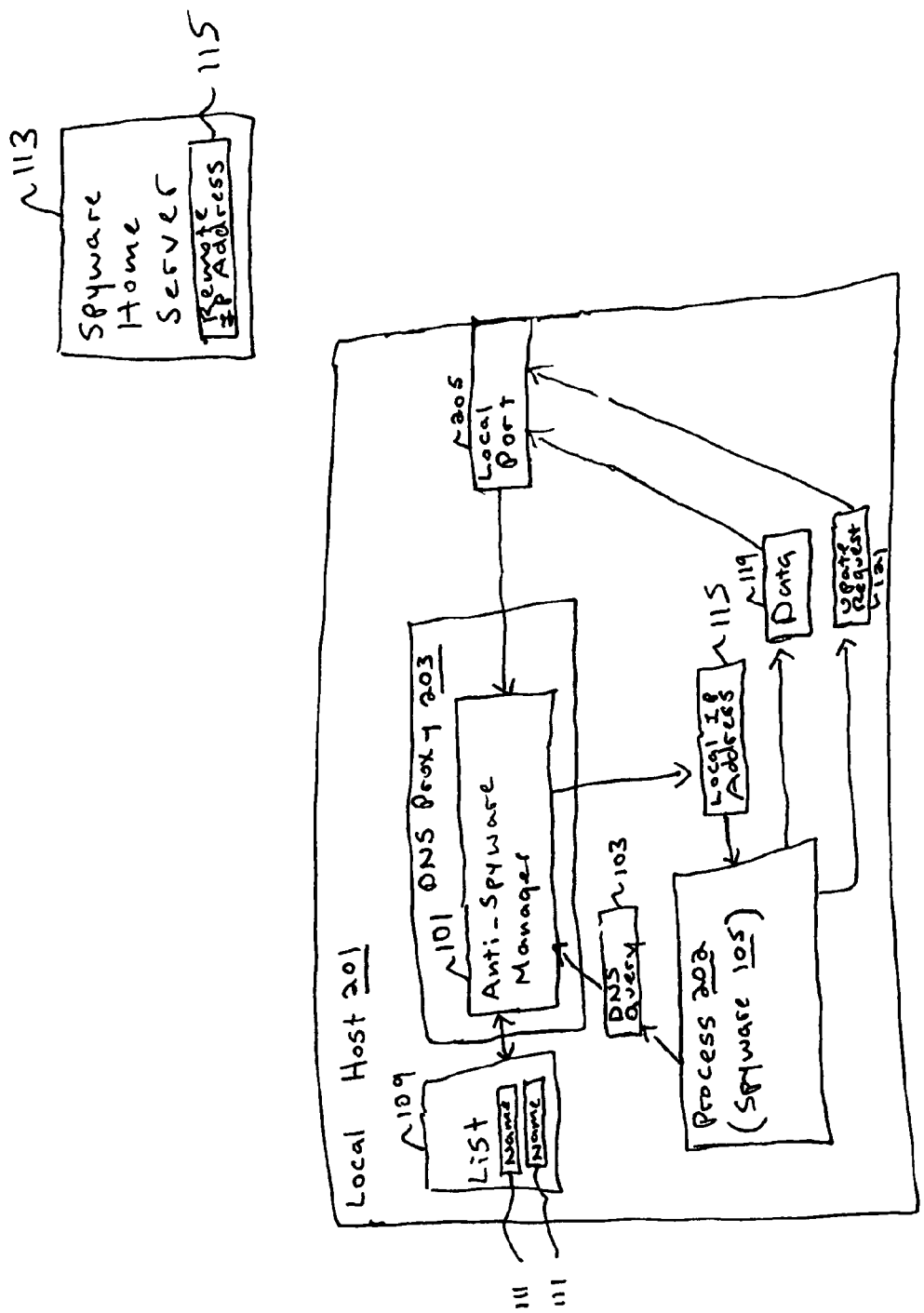
FIG. 2 is a block diagram illustrating a high level overview of an anti-spyware manager using domain name service resolution queries to combat spyware at a local host level, according to other embodiments of the present invention.

Turning now to FIG. 2, an embodiment of the present invention is illustrated in which the anti-spyware manager 101 combats spyware at a local host level 201 (e.g., on a home user's personal computer). As with the embodiment illustrated in FIG. 1, the anti-spyware manager 101 maintains a list 109 of domain names 111 associated with spyware 105. The anti-spyware manager monitors DNS resolution queries 103 made by processes 202 on the local host 201, and detects queries 103 on domain names 111 on the list 109. The implementation mechanics of monitoring DNS resolution queries 103 at a local host 201 level are known to those of ordinary skill in the relevant art, and the manner in which to apply same within the context of the present invention will be readily apparent to those of such a skill level, in light of this specification. For example, as illustrated this functionality can be implemented by a DNS proxy 203 on the local host 201. Alternatives include but are not limited to implementation at a network stack level or through the use of hosts.con (not illustrated).

When it detects such a query 103, the anti-spyware manager 101 forces the resolution to the IP address 115 of the local host (e.g., 127.0.0.1). The anti-spyware manager 101 determines a local port 205 on which to listen for attempts to communicate with the spyware home server 113 from the domain name service query 103. The anti-spyware manager 101 listens to the local host IP address 115 on that port 205. The anti-spyware manager is thus able to detect attempts by processes 202 on the local host 201 to communicate with spyware home servers 113. Attempts to transmit data 119 to or request updates 121 from the spyware home server 113 are routed to the IP address 115 of the local host via the local port 205, and detected by the anti-spyware manager 101.

When the anti-spyware manager 101 detects an attempt by a process 207 on the local host computer 201 to communicate with the local host 201 IP address 115 via the local port 205, the anti-spyware manager 101 determines that the local host 201 is infected with spyware 105. In other embodiments, the anti-spyware manager 101 determines that the local host computer 201 is infected with spyware 105 responsive to detecting a process 202 on the local host 201 making a domain name service query 103 on a domain name 111 on the list 109 of domain names 111 associated with spyware 105. When the anti-spyware manager 101 determines that the local host computer 201 is infected with spyware 105, the anti-spyware manager 101 can run a spyware removal program on the local host 201.

It is to be understood that domains identified as hosting spyware 105 can also host legitimate services. There are also circumstances under which it is desirable to allow deliberate access to spyware home servers 113 (e.g., the user wishes to view the Hotbar Website). Therefore, as illustrated in FIG. 3, in some embodiments of the present invention the anti-spyware manager 101 allows selective communication with one or more known spyware home servers 113. The selective access can be controlled in a variety of ways as desired. For example, access can be allowed to specific processes only (e.g., a trusted process 301 as illustrated) or blocked for specific processes only (e.g., a browser 303 as illustrated). Also, the user can be informed (e.g., via a graphical user interface) when such attempts are made by some or all processes, and the access can then be blocked or allowed as per the user's input. In yet other embodiments, various access and blocking policies can be applied as desired, based on factors such as differentiating between user initiated communication activity and automatic activity (e.g. startup items). Of course, selective access can be provided at both enterprise 107 and local host 201 levels.

As will be understood by those familiar with the art, the invention may be embodied in other specific forms without departing from the spirit or essential characteristics thereof. Likewise, the particular naming and division of the modules, agents, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. In one embodiment, the component is stored in an executable format on a computer readable storage medium and can be executed by a computer. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for combating spyware, the method comprising:
   using a computer to execute method steps, the steps comprising:
      maintaining a list of domain names associated with spyware;
      monitoring domain name service queries;
      detecting a domain name service query on a domain name on the list of domain names associated with spyware; and
      responsive to detecting the domain name service query on the domain name on the list of domain names associated with spyware, resolving the domain name service query to an Internet Protocol (IP) address of a designated computer, the IP address of the designated computer being different from an IP address of the domain name in the domain name service query.

2. The method of claim 1 wherein the step of monitoring domain name service queries is executed at an enterprise level.

3. The method of claim 2 further comprising:
   detecting an attempt by a host computer within the enterprise to communicate with the IP address of the designated computer; and
   determining that the host computer that made the attempt to communicate with the IP address of the designated computer is infected with spyware.

4. The method of claim 2 further comprising:
   resolving the domain name service query to an address of a server within the enterprise, wherein the address of the server within the enterprise is not associated with the domain name in the domain name service query.

5. The method of claim 2 further comprising:
   responsive to detecting the domain name service query on the domain name on the list of domain names associated with spyware, determining that a host computer from which the query originated is infected with spyware.

6. The method of claim 3 or claim 5 further comprising:
   responsive to determining that the host computer is infected with spyware, executing a spyware removal program on the host computer.

7. The method of claim 3 or claim 5 further comprising:
   responsive to determining that the host computer is infected with spyware, quarantining the host computer.

8. The method of claim 1 wherein the step of monitoring domain name service queries is executed by a local host computer.

9. The method of claim 8 further comprising:
   resolving the domain name service query to an address of the local host computer, wherein the address of the local host computer is not associated with the domain name in the domain name service query.

10. The method of claim 8 further comprising:
    responsive to detecting the domain name service query on the domain name on the list of domain names associated with spyware, determining that the local host computer is infected with spyware.

11. The method of claim 9 further comprising:
    detecting an attempt by a process on the local host computer to communicate with the address of the local host computer to which the resolution of the domain name service query was resolved; and
    determining that the local host computer is infected with spyware.

12. The method of claim 11 wherein the step of detecting an attempt by a process on the local host computer to communicate with the address of the local host further comprises:
    determining a local port of the local host computer on which to listen from the domain name service query;
    listening on the determined local port of the local host computer; and
    detecting the attempt by the process to communicate with the address of the local host via the local port.

13. The method of claim 11 or 10 further comprising:
    responsive to determining that the local host computer is infected with spyware, executing a spyware removal program on the local host computer.

14. The method of claim 1 further comprising:
    selectively allowing some approved communication with domain names associated with spyware.

15. The method of claim 1, further comprising:
    detecting a host computer attempting to communicate with the IP address of the designated computer; and
    determining that the host computer is infected with malware responsive to the detected attempt to communicate with the IP address of the designated computer.

16. A non transitory computer readable storage medium containing executable program code for combating spyware, the computer readable medium comprising program codes for:
    maintaining a list of domain names associated with spyware; monitoring domain name service queries; detecting a domain name service query on a domain name on the list of domain names associated with spyware; and
    responsive to detecting the domain name service query on the domain name on the list of domain names associated with spyware, resolving the domain name service query to resolve an Internet Protocol (IP) address of a designated computer, the IP address of the designated computer being different from an IP address of the domain name in the domain name service query.

17. The computer readable medium of claim 16 wherein the program code for monitoring domain name service queries is for executing at an enterprise level.

18. The computer readable medium of claim 17 further comprising program codes for:
  detecting an attempt by a host computer within the enterprise to communicate with the IP address of the designated computer; and
  determining that the host computer that made the attempt to communicate with the IP address of the designated computer is infected with spyware.

19. The computer readable medium of claim 17 further comprising program codes for:
  responsive to detecting the domain name service query on the domain name on the list of domain names associated with spyware, determining that a host computer from which the query originated is infected with spyware.

20. The computer readable medium of claim 18 or claim 19 further comprising program code for:
  responsive to determining that the host computer is infected with spyware, executing a spyware removal program on the host computer.

21. The computer readable medium of claim 16 wherein the program code for monitoring domain name service queries is for executing by a local host computer, the computer readable medium further comprising program codes for:
  resolving the domain name service query to an address of the local host computer, wherein the address of the local host computer is not associated with the domain name in the domain name service query;
  determining a local port of the local host computer on which to listen from the domain name service query;
  listening on the determined local port of the local host computer;
  detecting the attempt by the process to communicate with the address of the local host computer via the local port; and
  determining that the local host computer is infected with spyware responsive to the detected attempt.

22. The computer readable medium of claim 16 wherein the program code for monitoring domain name service queries is for executing by a local host computer, the computer readable medium further comprising program code for:
  responsive to detecting the domain name service query on the domain name on the list of domain names associated with spyware, determining that the local host computer is infected with spyware.

23. A computer system for combating spyware, the computer system comprising:
  a computer readable medium storing executable software portions, comprising:
    a software portion configured to maintain a list of domain names associated with spyware;
    a software portion configured to monitor domain name service queries;
    a software portion configured to detect a domain name service query on a domain name on the list of domain names associated with spyware; and
    a software portion configured to resolve the domain name service query to an Internet Protocol (IP) address of a designated computer, the IP address of the designated computer being different from an IP address of the domain name in the domain name service query, responsive to detecting the domain name service query on the domain name on the list of domain names associated with spyware.

* * * * *